US011767428B2

(12) United States Patent
Durand et al.

(10) Patent No.: US 11,767,428 B2
(45) Date of Patent: Sep. 26, 2023

(54) THERMOPLASTIC POWDER COMPOSITION AND REINFORCED THREE-DIMENSIONAL OBJECT PRODUCED BY 3D PRINTING OF SUCH A COMPOSITION

(71) Applicant: Arkema France, Colombes (FR)

(72) Inventors: Jean-Charles Durand, Evreux (FR); Ornella Zovi, Le Theil-Nolent (FR); Benoît Brule, Beaumont-le-Roger (FR)

(73) Assignee: Arkema France, Colombes (FR)

( * ) Notice: Subject to any disclaimer, the term of this patent is extended or adjusted under 35 U.S.C. 154(b) by 492 days.

(21) Appl. No.: 16/651,572

(22) PCT Filed: Oct. 4, 2018

(86) PCT No.: PCT/FR2018/052454
§ 371 (c)(1),
(2) Date: Mar. 27, 2020

(87) PCT Pub. No.: WO2019/069032
PCT Pub. Date: Apr. 11, 2019

(65) Prior Publication Data
US 2020/0255660 A1    Aug. 13, 2020

(30) Foreign Application Priority Data
Oct. 4, 2017  (FR) ...................................... 1759265

(51) Int. Cl.
| | |
|---|---|
| *C08L 77/06* | (2006.01) |
| *B29C 64/153* | (2017.01) |
| *B33Y 70/10* | (2020.01) |
| *B29C 45/00* | (2006.01) |
| *B29K 77/00* | (2006.01) |
| *B29K 309/08* | (2006.01) |
| *C08K 7/14* | (2006.01) |

(52) U.S. Cl.
CPC ............ *C08L 77/06* (2013.01); *B29C 64/153* (2017.08); *B33Y 70/10* (2020.01); *B29C 45/0001* (2013.01); *B29K 2077/00* (2013.01); *B29K 2309/08* (2013.01); *C08K 7/14* (2013.01); *C08K 2201/003* (2013.01); *C08K 2201/004* (2013.01)

(58) Field of Classification Search
None
See application file for complete search history.

(56) References Cited

U.S. PATENT DOCUMENTS

| | | |
|---|---|---|
| 9,233,505 B2 | 1/2016 | Martinoni |
| 9,643,359 B2 | 5/2017 | Baumann et al. |
| 10,450,414 B2 | 10/2019 | Martinoni et al. |
| 2007/0267766 A1 | 11/2007 | Hesse et al. |
| 2010/0068330 A1 | 3/2010 | Martinoni |
| 2011/0052927 A1 | 3/2011 | Martinoni et al. |
| 2013/0052453 A1 | 2/2013 | Filou et al. |
| 2017/0266882 A1 | 9/2017 | Yan et al. |
| 2020/0147900 A1 | 5/2020 | Yan et al. |

FOREIGN PATENT DOCUMENTS

| | | |
|---|---|---|
| CN | 101970557 A | 2/2011 |
| CN | 102712798 A | 10/2012 |
| CN | 104647760 A | 5/2015 |
| DE | 2906647 B1 | 4/1980 |
| EP | 0192515 A1 | 8/1986 |
| EP | 0303530 A1 | 2/1989 |
| EP | 1482011 A1 | 12/2004 |
| EP | 1634693 A1 | 3/2006 |
| EP | 1660566 A1 | 5/2006 |
| EP | 1648686 B1 | 12/2009 |
| EP | 2526151 B1 | 10/2013 |
| FR | 856752 A | 8/1940 |
| FR | 2907366 A1 | 4/2008 |
| JP | 2004346274 A | 12/2004 |
| JP | 2004352794 A | 12/2004 |
| JP | 2007-535585 A | 12/2007 |
| JP | 2010-509459 A | 3/2010 |
| JP | 2011-514420 A | 5/2011 |
| JP | 2013-517344 A | 5/2013 |
| WO | 2008057844 A1 | 5/2008 |
| WO | 2009114715 A2 | 9/2009 |
| WO | 2009138692 A2 | 11/2009 |

(Continued)

OTHER PUBLICATIONS

Office Action (The First Office Action) dated Jan. 5, 2022, by the China National Intellectual Property Administration in corresponding Chinese Patent Application No. 201880065205.4, and an English Translation of the Office Action. (14 pages).

International Search Report (PCT/ISA/210) dated Dec. 20, 2018, by the French Patent Office as the International Searching Authority for International Application No. PCT/FR2018/052454.

Office Action (Notice of Reasons for Rejection) issued on Jul. 26, 2022, by the Japanese Patent Office in corresponding Japanese Patent Application No. 2020-519136, and an English Translation of the Office Action. (8 pages).

(Continued)

*Primary Examiner* — Ana L. Woodward
(74) *Attorney, Agent, or Firm* — Boone IP Law

(57) ABSTRACT

The present invention relates to a reinforced thermoplastic powder composition, comprising:
at least one polyamide powder with a d50 of less than 100 μm,
from 5% to 70% by weight of at least one glass fiber:
  with a l50 within the range from 50 to 200 μm,
  with an lmax of less than 450 μm,
  with a d50 within the range from 4 to 40 μm,
  with a form factor F: l50/d50 of between 5 and 15, and
from 0.05% to 5% of a pulverulent flow agent with a d50 of less than 20 μm; with regard to the total weight of the composition.

The present invention relates in particular to the use of said composition in 3D printing processes for manufacturing reinforced three-dimensional objects.

15 Claims, No Drawings

(56) References Cited

FOREIGN PATENT DOCUMENTS

| WO | 2011089352 A1 | 7/2011 |
|---|---|---|
| WO | 2016/127521 A1 | 8/2016 |

OTHER PUBLICATIONS

FRP Constituent Material Introduction, Chapter 2, Constituent Materials and Types thereof, Glass Fibers, Japan Society for Composite Materials Journal, vol. 33, No. 4, 2007, pp. 141-149.

THERMOPLASTIC POWDER COMPOSITION AND REINFORCED THREE-DIMENSIONAL OBJECT PRODUCED BY 3D PRINTING OF SUCH A COMPOSITION

The present invention relates to a composition of thermoplastic powder, in particular polyamide, reinforced with glass fibers, and to its use in layer-by-layer powder agglomeration processes by melting or sintering in order to manufacture reinforced three-dimensional objects. These reinforced 3D objects exhibit particularly advantageous mechanical properties in the following fields: automobile, railroad, maritime, road transport, wind power, aeronautical and space, sport, construction, panels and leisure.

The term "reinforced 3D object", within the meaning of the invention, is understood to mean a three-dimensional object or part which exhibits:
- an elastic modulus of at least 3000 MPa, preferably of at least 3500 MPa;
- an elongation at break of greater than 6%;
- a breaking stress of greater than 60 MPa;
- the three properties above being measured according to the standard ISO 527-2: 93-1B for objects constructed in X/Y, that is to say manufactured mainly in two horizontal dimensions or "flat" in the 3D printing device;
- a heat deflection temperature (HDT) of at least 150° C., preferably of at least 180° C., determined according to the standard ISO 75-2:2013(fr), flatwise bars, method A (using a load of 1.8 MPa), with a heating temperature gradient of 50° $C.h^{-1}$.

Throughout this description, the expression "within the range from A to B" or "from A to B" denotes an interval including the limits mentioned. In contrast, the expression "between A and B" denotes an interval excluding the limits mentioned. The term "3D printing" or "additive manufacturing", within the meaning of the invention, is understood to mean any process for the volume manufacturing of parts by addition or agglomeration of powder, layer by layer. The agglomeration of powders by melting (hereinafter "sintering") is brought about by radiation, such as, for example, a laser beam (laser sintering), infrared radiation, UV radiation, or any source of electromagnetic radiation which makes it possible to melt the powder layer by layer in order to manufacture three-dimensional objects. The technology for manufacturing objects layer by layer is described in particular in the patent application WO2009138692 (pages 1 to 3).

The term "3D printing" or "additive manufacturing", within the meaning of the invention, is also understood to mean the selective sintering technologies using an absorber, in particular the technologies known under the names "High Speed Sintering" (HSS) and "Multi-Jet Fusion" (MJF). In these technologies, the manufacture of 3D objects is also carried out layer by layer from a digital file, the process using a powder (for example a polymer) which is melted in a controlled manner for each layer constituting the 3D object: an absorber is deposited on the layer (by means, for example, of a liquid ink in the "inkjet process") before the exposure of the layer to an electromagnetic radiation (for example infrared radiation) which brings about the melting of the zones containing said absorber. For example, the patent documents U.S. Pat. No. 9,643,359 and EP 1 648 686 describe such processes.

3D printing is generally used to produce prototypes, models of parts ("rapid prototyping") or to produce finished parts in small series ("rapid manufacturing"), for example in the fields: automobile, nautical, aeronautical, aerospace, medical (prostheses, hearing systems, cell tissues, and the like), textiles, clothing, fashion, decoration, housings for electronics, telephony, home automation, computers, lighting.

The present invention is more particularly concerned here with the following markets:
- the automobile industry, and is targeted at manufacturing technical parts for cars, motorcycles and trucks, offering high thermal resistance, mechanical strength and chemical resistance. Said technical parts are used in particular in (braking, clutch, cooling) fluid transfer or gasoline circuits, transmission systems, opening systems and noise reduction systems;
- aeronautics, and is targeted at meeting the needs and standards of aircraft manufacturers to reduce fuel consumption, to build stronger, lighter, more comfortable and more secure aircraft; and
- sport, in which the manufacturers of sports articles are confronted with several challenges: the articles must develop toward becoming lighter in order to reduce as much as possible the energy expended during their use. They must also enable the sportsperson to obtain the sensations required for movement control and to rapidly transmit muscle impulses. The stiffness of a part is directly linked to the elastic modulus of the constituent material of this part and to the cube of the thickness of the walls. A material with a high modulus makes it possible to reduce the thicknesses of the parts and thus to achieve a considerable gain in lightness of the latter while retaining the stiffness required for a good elastic return essential to the sportsperson.

In these markets, materials based on polyamides reinforced with glass fibers are generally chosen both for their mechanical properties and their physico-chemical resistance. These polyamides are easy to employ by conventional injection molding, extrusion, molding and/or assembling processes.

3D printing processes require a preliminary conversion of these PAs into the form of powders of appropriate particle size, with a d50 of less than 100 μm, preferably within the range from 20 to 100 μm.

These powders must be appropriate, and in particular have a sufficient flow capacity, to be used in additive manufacturing devices, and to make possible the manufacture of reinforced parts with satisfactory mechanical properties, in particular in terms of modulus, of elongation at break, of breaking stress and of HDT.

The document EP 1 660 566 describes a powder for the layer-by-layer manufacture of a 3D object, comprising substantially spherical powder particles and reinforcing fibers, characterized in that the mean length l50 of the fibers corresponds at the most to the mean diameter d50 of the powder particles.

The document EP 1 634 693 describes a powder mixture capable of sintering for rapid prototyping, comprising a polymer matrix in the powder form and a reinforcing material in the form of fibers, in which said fibers are cut and/or ground, said cut fibers having a length of between 3 and 6 mm, and said ground fibers having a length of between 150 and 450 μm. The breaking stress of the 3D objects obtained by sintering of this mixture is 55 to 60 MPa, which is not sufficient for the applications targeted by the present invention, which require a breaking stress of greater than 60 MPa.

The document U.S. Pat. No. 9,233,505 describes a polymer powder composition comprising at least 3% of reinforcing particles (with minimum ratio length/diameter: 5/1), at least 1% of which (of the composition) are inorganic particles comprising a silicate. As indicated by this document, in particular table 2 of this document, even if the module and the HDT are improved, the addition of glass particles to the composition drastically reduces the breaking stress of the 3D objects obtained by sintering of such a composition. The use of wollastonite as reinforcing particle would on the contrary make it possible to retain a breaking stress of approximately 45 MPa, that is to say of the same order of magnitude as that of the 3D object obtained with the pure powder without reinforcement. However, the breaking stress values obtained for these compositions remain here again insufficient in the case of the applications targeted by the present invention.

A subject matter of the present invention is thus the provision of a reinforced pulverulent thermoplastic composition which can be used in 3D printing, that is to say which exhibits a "flowability" (or flow capacity) such that the composition flows:
in less than 5 seconds through a diameter of 25 mm, and
in less than 30 seconds through a diameter of 15 mm,
in the flowability test according to the standard ISO 6186: 1998.

Ideally, said powder composition should also be able to be easily recycled after one or more passage(s) in a 3D machine.

Another aim of the present invention is to provide a pulverulent composition which makes it possible to directly manufacture, by 3D printing, a "reinforced object" which exhibits improved mechanical properties compatible with the requirements of the automobile industry, the aeronautical industry or sport, that is to say simultaneously combining:
an elastic modulus of at least 3000 MPa, preferably of at least 3500 MPa,
an elongation at break of greater than 6%,
a breaking stress of greater than 60 MPa, and
an HDT of at least 150° C., preferably of at least 180° C.

A further aim of the present invention is to provide a process for the manufacture of reinforced objects directly by 3D printing, in particular by Multijet Fusion or by to laser sintering, said objects also having to exhibit a good resolution or definition, namely a regular, smooth and homogeneous surface appearance, and precise edges.

The applicant company has now found a composition capable of meeting the above requirements, by a precise choice of the morphology of the glass fibers used.

A subject matter of the present invention is thus a reinforced thermoplastic powder composition, comprising:
at least one polyamide powder with a d50 of less than 100 μm, preferably according to a content of 25% to 95% by weight,
from 5% to 70% by weight of glass fibers:
with an l50 within the range from 50 to 200 μm,
with an lmax of less than 450 μm,
with a d50 within the range from 4 to 40 μm,
with a form factor F: l50/d50 of between 5 and 15, and
from 0.05% to 5%, preferably from 0.05% to 2%, by weight of a pulverulent flow agent with a d50 of less than 20 μm;
with regard to the total weight of the composition.

Advantageously, said polyamide is chosen from: polyamides and copolyamides comprising at least one of the following monomers: 46, 4T, 54, 59, 510, 512, 513, 514, 516, 518, 536, 6, 64, 69, 610, 612, 613, 614, 616, 618, 636, 6T, 9, 104, 109, 1010, 1012, 1013, 1014, 1016, 1018, 1036, 10T, 11, 12, 124, 129, 1210, 1212, 1213, 1214, 1216, 1218, 1236, 12T, MXD6, MXD10, MXD12, MXD14, and their mixtures, preferably chosen from: PA 11, PA 12, PA 1010, PA 6, PA 6/12, PA 11/1010, and their mixtures.

Advantageously, the glass fibers comprise, expressed in terms of oxides as % by weight with regard to the weight of glass fiber: from 52% to 74% of silicon dioxide ($SiO_2$), from 2% to 26% of aluminum oxide ($Al_2O_3$), from 0% to 23% of boron oxide ($B_2O_3$), from 0% to 25% of calcium oxide (CaO), from 0% to 25% of magnesium oxide (MgO), from 0% to 5% of zinc oxide (ZnO), from 0% to 5% of strontium oxide (SrO), from 0% to 1% of barium oxide (BaO), from 0% to 5% of lithium oxide ($Li_2O$), from 0% to 16% of sodium oxide ($Na_2O$), from 0% to 20% of zirconium oxide ($ZrO_2$), from 0% to 3% of potassium oxide ($K_2O$), from 0% to 3% of titanium oxide ($TiO_2$), from 0% to 3% of iron oxide ($Fe_2O_3$).

Advantageously, the flow agent is chosen from: silicas, hydrated silicas, amorphous alumina, vitreous silicas, vitreous phosphates, vitreous borates, vitreous oxides, titanium dioxide, talc, mica, fumed silicas, pyrogenic silicas, kaolin, attapulgite, calcium silicates, alumina and magnesium silicates.

Advantageously, the glass fibers represent from 5% to 60% by weight, preferably from 15% to 45% by weight, more preferably from 20% to 40% by weight, with regard to the total weight of the composition.

Advantageously, the glass fiber exhibits:
an l50 within the range from 100 to 200 μm,
a d50 within the range from 6 to 30 μm,
a form factor F: l50/d50 of between 8 and 12.

Preferably, the d50 of the glass fiber is within the range from 10 to 25 μm.

Advantageously, the form factor F: l50/d50 of the fiber is within the range from 9 to 11, preferably substantially equal to 10.

Another subject matter of the present invention is a process for the manufacture of a powder composition in accordance with the invention, comprising the following stages:
a) mixing by dry blending of the polyamide powder with the glass fibers as are defined by the present invention;
b) adding the flow agent to the powder obtained in a).

Dry blending is preferred to compounding in the process according to the invention. This is because, although possible, compounding would require a subsequent grinding stage in order to obtain a d50 powder in accordance with the present invention, which tends to break the glass fibers and thus to reduce the form factor of the fibers.

Another subject matter of the present invention is the use of 25% to 40% by weight of glass fibers:
with a l50 within the range from 50 to 200 μm,
with an lmax of less than 450 μm,
with a d50 within the range from 4 to 40 μm, preferably from 6 to 30 μm,
with a form factor F: l50/d50 of between 5 and 15,
in a polyamide-based powder with a d50 of less than 100 μm, in order to manufacture, by 3D printing, an object with a modulus greater than the modulus of an object of the same shape manufactured by injection molding of the same composition.

Preferably, the glass fiber exhibits, in this use:
an l50 within the range from 100 to 200 μm,
a d50 within the range from 10 to 25 μm,
a form factor F: l50/d50 of between 8 and 12.

Another subject matter of the present invention is a process for the manufacture of a reinforced three-dimensional object, comprising the layer-by-layer sintering of a powder having a composition in accordance with the invention, said process producing an X/Y construction.

A further subject matter of the present invention is a reinforced three-dimensional article or object capable of being manufactured according to the above process, said object having mechanical properties which are superior to those of an object of the same shape manufactured by an injection molding process of the same composition according to the invention. In particular, the reinforced 3D object according to the invention exhibits:

an elastic modulus of at least 3000 MPa,
an elongation at break of greater than 6%,
a breaking stress of greater than 60 MPa, and
a heat deflection temperature (HDT) of at least 150° C.

Advantageously, the reinforced 3D object according to the invention is a component of sports equipment, of a shoe, of a sports shoe, of a shoe sole, of a decoration, of luggage, of glasses, of furniture, of audio-visual equipment, of a computer or of automobile or aeronautical equipment and/or a component of medical equipment.

Polyamide-Based Powders

The term "polyamide-based powders" is understood to mean pulverulent compositions comprising more than 50% by weight of polyamide (abbreviated hereinafter to PA). The term "polyamide powders" is understood to mean those comprising more than 95% by weight of polyamide. Polyamide powders can be produced by different processes which each result in different powder characteristics. Mention may be made of direct synthesis processes, which lead, for example, to polyamide 12 powders by polymerization of lauryllactam or of aminododecanoic acid. Depending on the type of process, it is possible to obtain nonporous perfectly spherical powders or else porous spheroidal powders. In the latter case, mention may be made of the PA 12 powders, sold by Arkema France under the Orgasol® name. There also exist dissolution/precipitation processes which result in polymer powders by dissolution of a polymer in a solvent, followed by reprecipitation in the powder form.

Polyamide (homopolyamide or copolyamide) within the meaning of the invention is understood to mean the condensation products of lactams, amino acids and/or diacids with diamines and, as a general rule, any polymer formed by units or monomers linked together by amide groups.

The standard NF EN ISO 1874-1: 2011 defines a nomenclature for polyamides. The term "monomer" in the present description of polyamide-based powders must be taken with the meaning of "repeat unit". The case where a repeat unit of the polyamide consists of the combination of a diacid with a diamine is particular. It is considered that it is the combination of a diamine and of a diacid, that is to say the "diamine diacid", also called "XY", pair, in equimolar amount, which corresponds to the monomer. This is explained by the fact that, individually, the diacid or the diamine is only a structural unit, which is not enough by itself alone to polymerize. In the case where the powder particles according to the invention comprise at least two different monomers, called "comonomers", that is to say at least one monomer and at least one comonomer (monomer other than the first monomer), they comprise a copolymer, such as a copolyamide, abbreviated to CoPA.

Monomers of XY type:

Mention may be made, by way of example of diamine X, of aliphatic diamines having from 6 to 12 atoms, it also being possible for diamine X to be aryl and/or saturated cyclic. Mention may be made, by way of examples, of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyol diamines, isophoronediamine (IPD), methylpentamethylenediamine (MPDM), bis(aminocyclohexyl)methane (BACM), bis(3-methyl-4-aminocyclohexyl) methane (BMACM), meta-xylylenediamine, bis(p-aminocyclohexyl)methane and trimethylhexamethylenediamine.

Mention may be made, by way of example of diacid (or dicarboxylic acid) Y, of acids having between 4 and 18 carbon atoms. Mention may be made, for example, of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—$(CH_2)_{10}$—COOH.

The lactam or amino acid monomers are said to be of "Z" type:

Mention may be made, by way of example of lactams, of those having from 3 to 12 carbon atoms on the main ring and which can be substituted. Mention may be made, for example, of β,β-dimethylpropiolactam, α,α-dimethylpropiolactam, amylolactam, caprolactam, capryllactam, enantholactam, 2-pyrrolidone and lauryllactam.

Mention may be made, by way of example of amino acid, of α,ω-amino acids, such as aminocaproic, 7-aminoheptanoic, 11-aminoundecanoic, n-heptyl-11-aminoundecanoic and 12-aminododecanoic acids.

The polymerization between the various abovementioned monomers can be of the hydrolytic polycondensation, anionic polymerization or also cationic polymerization type. The hydrolytic polymerization, especially used for lactams, is brought about by water at high temperature. For example, the hydrolytic polymerization of lactams consists in opening the lactam with water and in then heating under pressure in order to polymerize. Optionally, a catalyst, such as phosphoric acid, can also be employed in the hydrolytic process. The anionic polymerization is carried out at much lower temperatures than those applied for the hydrolytic or cationic mechanisms. The anionic polymerization is carried out continuously or else, preferably, batchwise in a solvent. The anionic route relates more specifically to cyclic molecules, such as lactams. For example, the mechanism for the anionic polymerization of lactams takes place in three stages: an initiation stage, in order to form the lactamate anion, then an activation reaction, which results in the acyllactam, and finally the propagation stage. The anionic polymerization method is thus based essentially on the use of a catalyst and of an activator in the presence optionally of a finely divided inorganic or organic filler having a role of crystallization seed and in the presence of an amide. The process is described in the patents EP 192 515 and EP 303 530. The cationic polymerization is catalyzed by acids under anhydrous conditions. In this case, acids, such as hydrochloric acid, phosphoric acid or hydrobromic acid, are the most reactive but the use of Lewis acids or of ammonium salts is also possible. There essentially exist two types of activation and of growth of the chain. Either the activated monomer reacts with the neutral reactive center, or it is the reactive center which is activated and the monomer which is neutral.

Preferably, the polyamide-based powders of the invention comprise at least one polyamide chosen from polyamides and copolyamides comprising at least one of the following XY or Z monomers: 46, 4T, 54, 59, 510, 512, 513, 514, 516, 518, 536, 6, 64, 69, 610, 612, 613, 614, 616, 618, 636, 6T, 9, 104, 109, 1010, 1012, 1013, 1014, 1016, 1018, 1036, 10T, 11, 12, 124, 129, 1210, 1212, 1213, 1214, 1216, 1218, 1236, 12T, MXD6, MXD10, MXD12, MXD14, and their mixtures, in particular chosen from PA 11, PA 12, PA 1010, PA 6, PA 6/12, PA 11/1010, and their mixtures.

According to another advantageous embodiment of the invention, said polyamide-based particles comprise at least one copolymer comprising polyamide blocks and polyether or polyether-block-amide, abbreviated to PEBA, blocks. These PEBA particles are, for example, described in the patent document EP 2 526 151 and can be added, preferably by dry blending, to the composition according to the present invention.

PEBAs result from the polycondensation of polyamide blocks having reactive ends with polyether blocks having reactive ends, such as, inter alia:
1) polyamide blocks having diamine chain ends with polyoxyalkylene blocks having dicarboxylic chain ends,
2) polyamide blocks having dicarboxylic chain ends with polyoxyalkylene blocks having diamine chain ends, obtained by cyanoethylation and hydrogenation of α,ω-dihydroxylated aliphatic polyoxyalkylene blocks, known as polyether diols,
3) polyamide blocks having dicarboxylic chain ends with polyether diols, the products obtained being, in this particular case, polyetheresteramides.

The polyamide blocks having dicarboxylic chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine. The number-average molar mass Mn of the polyamide blocks is within the range extending from 400 to 20 000 g/mol, preferably from 500 to 10 000 g/mol and more preferably from 600 to 6000 g/mol.

The polymers having polyamide blocks and polyether blocks can also comprise randomly distributed units.

The polyamide blocks can comprise homopolyamides or copolyamides, such as those described above in the present description.

Polyether (hereinafter abbreviated to PE) blocks within the meaning of the invention is understood to mean polyalkylene ether polyols, in particular polyalkylene ether diols. The polyether (PE) blocks comprise at least one polymer chosen from poly(ethylene glycol) (PEG), poly(1,2-propylene glycol) (PPG), poly(1,3-propylene glycol) (PO3G), poly(tetramethylene glycol) (PTMG), polyhexamethylene glycol, poly(1,3-propylene glycol) (PO3G), poly(3-alkyltetrahydrofuran), in particular poly(3-methyltetrahydrofuran) (poly(3MeTHF)), and their copolymers or mixtures. It is also possible to envisage a PE block of block or random "copolyether" type containing a sequence of at least two abovementioned types of PE.

The polyether blocks can also compromise ethoxylated primary amines. These blocks are also advantageously used. Mention may be made, by way of example of ethoxylated primary amines, of the products of formula:

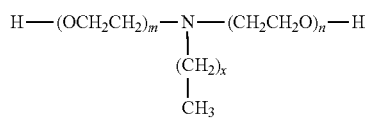

in which m and n are of between 1 and 20 and x between 8 and 18. These products are commercially available under the Noramox® brand from CECA and under the Genamin® brand from Clariant.

Thus, the chain ends of the PE blocks can be diOH, diNH$_2$, diisocyanate or diacid according to their process of synthesis.

The PE blocks having NH$_2$ chain ends can be obtained by cyanoacetylation of α,ω-dihydroxylated aliphatic polyoxyalkylene sequences known as polyether diols, such as Jeffamines® D300, D400, D2000, ED-600, ED-900, ED2003, Elastamines® RP-409, RP-2009, RT-1000, RE-600, RE-900, RE-2000, HT-1700, HE-180 from Huntsman. Such blocks are described in the patents JP 2004346274, JP 2004352794 and EP 1 482 011. The molar mass Mn of the polyether blocks is within the range extending from 100 to 6000 g/mol and preferably from 200 to 3000 g/mol, more preferentially still from 250 to 2000 g/mol.

The preparation of the copolymers having polyamide block(s) and polyether block(s) according to the invention comprises any means which makes it possible to couple together the polyamide blocks (PA block) and the polyether blocks (PE block). In practice, essentially two processes, one a "2-stage" process and the other a one-stage process, are used; these two processes are well known and described, for example, in the patent application FR 0 856 752.

According to a specific embodiment of the present invention, the polyamide-based powders comprise at least one copolymer having polyamide blocks and polyether blocks chosen from: PA12-PEG, PA6-PEG, PA6/12-PEG, PA11-PEG, PA12-PTMG, PA6-PTMG, PA6/12-PTMG, PA10.10-PEG, PA10.10-PTMG, PA11-PTMG, PA12-PEG/PPG, PA6-PEG/PPG, PA6/12-PEG/PPG, PA11-PEG/PPG, and their mixtures.

Depending on the method of synthesis of the polymers which are described above, powder or else granules is/are obtained directly. Powder is obtained directly by anionic polymerization. In order to obtain polyamide-based powder in the case of the other types of polymerization, mention may be made, for example, of dissolution-precipitation, that is to say solubilization of the polyamide-based polymer in a solvent under hot conditions, followed by precipitation of the powder by slow cooling. Such a process is described, for example, in the document DE 2906647. Mention may also be made of atomization, that is to say the spraying of a solution of the cooled polymer. This technique is also called "cold nebulization" or "spray cooling". There also exists a polymer extrusion process, followed by atomization by a heated high-pressure nozzle, then cooling of the powder obtained. This technique is also called "hot nebulization" or "spray drying". Mention may also be made of the grinding/sieving of polymer granules, optionally followed by a rise in viscosity. The grinding can be cryogenic. All these techniques for obtaining powder are already well known to a person skilled in the art.

Advantageously, said powder results at least partially from renewable or bioresourced materials; it then contains $^{14}$C, this biocarbon content being determined in accordance with the standard ASTM D 6866.

The d50 of a powder corresponds to the value of the particle size which divides the population of particles examined exactly into two. In other words, in the composition according to the invention, 50% of the particles have a size of less than 100 μm.

The d50 of less than 100 μm, preferably from 20 to 100 μm, of the composition according to the invention contributes to obtaining a precisely defined 3D object, with a smooth and regular surface appearance.

The d50 is measured according to the standard ISO 9276—parts 1 to 6: "Representation of results of particle size analysis". In the present description, a laser particle size, for example of Insitec type from Malvern with software of RT Sizer type, is used to obtain the particle size distribution of the powder and to deduce the d50 therefrom.

Glass Fibers

Glass fibers within the meaning of the invention is understood to mean all filaments obtained by drawing molten glass and meeting the criteria of morphology and particle size defined by the present invention. The document ASM Handbook, Vol. 21: Composites, by F. T. Wallenberger, J. C. Watson and H. Li, PPG Industries Inc, gives a general definition of glass fibers and the composition of the main commercial glass fibers.

The glass fiber is generally obtained from silica, and from additives mainly comprising alumina, calcium carbonate, magnesia, boron oxide, and which can also comprise fluorine, sodium oxide, potassium oxide, zirconium oxide, iron oxide, titanium oxide, and the like, and their mixtures.

Mention may be made, among the main manufacturers of reinforcing glass fibers, of Owens Coming, PPG Industries, Saint-Gobain, Lanxess, Asahi, or also Nittobo.

The manufacture of glass fibers generally involves one or more of the following stages:
mixing of the oxides (composition)
melting (1500° C.)
fiberizing (around 1250° C.)
drawing
sizing
weaving
grinding
cutting Sizing denotes the surface treatments applied to the reinforcing fibers at the bushing outlet. The size is generally an aqueous emulsion containing from 0.05% to 10% by weight of organic compounds. Among these organic compounds, also called coupling agents, silanes, lubricating agents, tackifying agents, wetting agents and emulsifiers are in particular distinguished.

The glass fiber used in the polyamide composition of the present invention preferably comprises, expressed in terms of oxides as % by weight, with regard to the weight of glass fiber: from 52% to 74% of silicon dioxide ($SiO_2$), from 2% to 26% of aluminum oxide ($Al_2O_3$), from 0% to 23% of boron oxide ($B_2O_3$), from 0% to 25% of calcium oxide (CaO), from 0% to 25% of magnesium oxide (MgO), from 0% to 5% of zinc oxide (ZnO), from 0% to 5% of strontium oxide (SrO), from 0% to 1% of barium oxide (BaO), from 0% to 5% of lithium oxide ($Li_2O$), from 0% to 16% of sodium oxide ($Na_2O$), from 0% to 20% of zirconium oxide ($ZrO_2$), from 0% to 3% of potassium oxide ($K_2O$), from 0% to 3% of titanium oxide ($TiO_2$), from 0% to 3% of iron oxide ($Fe_2O_3$).

Depending on the type of properties desired, this composition of the glass fibers can be adjusted, for example as indicated in the following tables 1 and 2:

TABLE 1

Types of glass fibers

| Type | General information |
| --- | --- |
| E | For general use: good electrical properties |
| D | High dielectric properties |
| A | High alkali content |
| C | Chemical resistance (battery separators) |
| S | High mechanical strength |
| R | High mechanical strength (aerospace, aeronautical or armament) |
| AR | Resistant in basic medium |
| E-CR | For use in acidic medium |

TABLE 2

Compositions of the main types of reinforcing glass fibers
Compositions of the main types of reinforcing glass fibers

| Main constituents | | Composition by weight (%) | | | | | | | |
| --- | --- | --- | --- | --- | --- | --- | --- | --- | --- |
| | | E Glass | D Glass | A Glass | C Glass | R Glass | S Glass | AR glass | E-CR glass |
| Silica | $SiO_2$ | 53 to 56 | 73 to 74 | 70 to 72 | 60 to 65 | 58 to 60 | 64 to 65 | 60 to 63 | 52 to 56 |
| Alumina | $Al_2O_3$ | 12 to 16 | traces | 0.5 to 2.5 | 2 to 5.5 | 23.5 to 25.5 | 24 to 25 | 0.3 to 0.7 | 10 to 16 |
| Lime | CaO | 21 to 24 | 1 | 5 to 10 | 12 to 14 | 14 to 17 | | 0.6 to 5.2 | 18 to 25 |
| Magnesia | MgO | | | 1 to 4 | 1 to 3 | | 10 to 11 | 0.05 | 0 to 5 |
| Boron oxide | $B_2O_3$ | 5 to 9 | 22 to 23 | 0 to 0.5 | 2 to 5.5 | | | 0.05 | |
| Fluorine | F | 0 to 1 | | | | | | | |
| Sodium Oxide | $Na_2O$ | 1 | 1.3 | 12 to 15 | 8 to 10 | | 0 to 1 | 14.8 to 15.8 | 1 |
| Potassium Oxide | $K_2O$ | | 1.5 | 1 to 2.5 | | | | 0.3 to 2.5 | |
| Zirconium oxide | $ZrO_2$ | | | | | | | 15.8 to 19.5 | |
| Iron oxide | $Fe_2O_3$ | 1 | 0.1 to 0.2 | traces | | | | 0.05 | 0 to 0.5 |
| Titanium oxide | $TiO_2$ | | | | | | | 0.05 to 0.07 | 0 to 3 |

In the present invention, the glass fiber used can comprise the following forms: glass fiber, elongated glass powder or bead or powder, glass flakes, ground fiber, provided that the form factor F=l50/d50 is of between 5 and 15, that is to say greater than 5 and less than 15. Among these forms, the glass fiber form is preferred for its property of reinforcing the polymer composition of the invention. It is preferably an E glass fiber, which is highly effective in reinforcing the polymer composition of the invention.

The number-average diameter of the fibers d50, in particular defined by the standard ISO 1888: 2006, corresponds to the value of diameter of the fibers which divides the population of fibers examined exactly into two. In other words, in the composition according to the invention, 50% of the fibers have a diameter of less than or equal to 40 μm.

The diameter d50 of the glass fibers used according to the invention is within the range from 4 to 40 μm, preferably from 6 to 30 μm, indeed even better from 10 to 25 μm.

The number-average length of the fibers l50 corresponds to the value of length of the fibers which divides the population of fibers examined exactly into two. In other words, in the composition according to the invention, 50% of the fibers have a length of less than 200 μm.

The length l50 of the glass fibers used according to the invention is within the range from 50 to 200 μm, knowing that the form factor F=l50/d50 must be of between 5 and 15. The l50 is in particular defined by the standard ISO 22314: 2006.

The maximum length (lmax), or the largest fiber, of the glass fibers used according to the invention must be less than 450 μm. This is because the 3D printing of powder comprising fibers with a greater maximum length, for example of 500 μm, proves to be very difficult during passage through the machine.

In order to determine the lengths and diameters of glass fibers, the glass fibers are recovered after optional calcination of the material comprising them at the appropriate temperature. The standard ISO 22314: 2006 (en) gives in particular a measurement method which can be used in the present invention.

In the present description of the invention, and in particular the examples below, the lengths of glass fibers are determined from images obtained by optical microscopy. The mean values of the lengths and diameters of fibers are calculated from the statistical study of approximately 1000 fibers for each test.

The glass fiber can also be in the form of elongated specks or elongated glass flakes, which can be produced by any conventional production process, in particular by spraying the melt. The thickness of the glass specks is preferably from 0.1 to 10 μm, while the l50, the d50 (perpendicular to the smallest thickness of the speck or flake) and the form factor F always meet the criteria for choice of the glass fiber according to the invention.

Ground fibers can be produced by any known conventional process. For example, a ground fiber can be produced by pulverizing a strand of a glass fiber using a hammer mill or a ball mill. In this case also, the diameter d50 of the fiber and the length l50 to diameter d50 ratio (form factor F) of the ground fiber are from 4 to 40 μm and between 5 and 15, respectively.

Elongated or elliptical glass beads produced, for example, by melting and spraying the glass melt can be regarded as glass fibers in accordance with the present invention inasmuch as the size l50 of the particles of glass beads is also from 50 to 200 μm, the diameter d50 (implying the biggest diameter perpendicular to l50) of the elongated bead and the ratio of length l50 to diameter d50 (form factor F) of the elongated bead are from 4 to 40 μm and between 5 and 15, respectively.

In the present invention, two or more forms of glass fibers chosen from: glass fiber, elongated glass powder, elongated glass flakes, ground fiber and elongated glass beads, can be used in combination as "glass fibers" within the meaning of the invention.

The glass fibers used in the composition according to the invention may or may not be sized by a coupling agent. Preferably, the compositions according to the present invention use sized glass fibers comprising silanes as coupling agent.

The glass fiber thus treated at the surface with a coupling agent makes possible an increased affinity and an increased adhesion between the polyamide powder and the glass fiber, which prevents any possible decrease in the density of the 3D object which can be caused by the formation of voids.

Mention may be made, as coupling agent, of those based on silane, on borane, on aluminates, those of titanate type, and the like. In particular, silane coupling agents are preferred because they make possible good adhesion between the polyamide and the glass fiber. Use may be made, as silane coupling agent, of aminosilane, epoxysilane and/or acrylsilane coupling agents. Among silane coupling agents, aminosilane coupling agents are preferred.

In addition, the treatment of the fibers can optionally comprise film-forming agents, lubricating agents and/or antistatic agents, in addition to the coupling agent. These components can be used alone or in combination. Mention may be made, as examples of film-forming agent, of vinyl acetate, urethane, acrylic, polyester, polyether, phenoxy, polyamide, epoxy and/or the like resins. Mention may be made, as examples of lubricating agent, of aliphatic ester, aliphatic ether, aromatic ester, or also aromatic ether surface-active agents. Mention may be made, as example of antistatic agent, of inorganic salts, such as lithium chloride or potassium iodide, as well as quaternary ammonium salts, such as ammonium chloride or ammonium ethosulfate.

In the present invention, the glass fiber content in the polyamide powder composition is from 5% to 70% by weight, preferably from 5% to 60% by weight, preferably from 20% to 40% by weight, with regard to the total weight of the composition. If the glass fiber content is less than 5% by weight, the 3D part obtained by 3D printing of the polyamide powder composition tends to have inadequate mechanical properties, whereas, if the glass fiber content is greater than 60% by weight, the contact surface area between the polyamide powder and the glass fiber is increased, which tends to reduce the suitability of the composition for 3D printing and/or the dimensional accuracy (geometry, surface, dimension) of the 3D object obtained.

When the amount of glass fiber in the polyamide composition is within the range recommended above, it is possible to produce a 3D object combining both good mechanical properties and excellent dimensional accuracy, by simple 3D printing of the composition.

Additives Other Than Glass Fiber in Accordance with the Invention

Advantageously, the powder according to the invention also contains at least one additive chosen from: optical brighteners, pigments, dyes, UV stabilizers, antioxidants, flame retardants, stabilizers, flow agents, organic or inorganic fillers, silica powder, powder binders, carbon nanotubes and their mixtures.

Advantageously, the composition of the invention also comprises a flow agent in a sufficient amount (which represents from 0.05% to 5%, preferably from 0.05% to 2%, by weight of the composition) for the composition to flow and to form a flat layer, in particular during a layer-by-layer sintering process. The flow agent is chosen from those commonly used in the field of the sintering of polymer powders. Preferably, this flow agent is of substantially spherical shape. It is, for example, chosen from: silicas, precipitated silicas, hydrated silicas, vitreous silicas, fumed silicas, pyrogenic silicas, vitreous phosphates, vitreous borates, vitreous oxides, amorphous alumina, titanium dioxide, talc, mica, kaolin, attapulgite, calcium silicates, alumina and magnesium silicates.

The compositions according to the invention can, of course, also comprise any type of additive suitable for the polymer powders used in 3D printing: in particular additives which contribute to improving the properties of the powder for its use in agglomeration technology and/or additives making it possible to improve the mechanical (breaking stress and elongation at break) or esthetic (color) properties of the objects obtained by fusion. The composition of the invention can in particular comprise dyes, pigments for coloring, $TiO_2$, pigments for infrared absorption, carbon black, fire-retardant additives, carbon fibers and the like.

The compositions of the invention can also contain at least one additive chosen from stabilizers, antioxidants, light stabilizers, impact modifiers, antistatic agents, flame retardants and their mixtures.

These additives are preferably in the form of a powder with a d50 of less than 60 μm.

Another subject matter of the present invention is the use of a thermoplastic powder composition as defined above in a 3D printing, in particular sintering, and X/Y (predominantly horizontal) construction process, for manufacturing an object with mechanical properties, in particular modulus, which are superior to those of an object of the same shape manufactured by a process for the injection molding of said composition.

A subject matter of the present invention is in particular a process for the manufacture of a reinforced three-dimensional object, comprising the layer-by-layer sintering of a powder having a composition according to the invention.

Preferably, said process uses one of the following sintering processes: laser sintering, "High Speed Sintering" (HSS) or "Multi-Jet Fusion" (MJF).

Eventually, the present invention relates to a three-dimensional object obtained by 3D printing, said object having mechanical properties (in particular modulus, elongation at break and/or breaking stress, HDT) which are superior to those of an object of the same shape manufactured by a process for the injection molding of said composition.

Advantageously, the object according to the invention exhibits:
an elastic modulus of at least 3000 MPa, preferably of at least 3500 MPa,
an elongation at break of greater than 6%,
a breaking stress of greater than 60 MPa, and
a heat deflection temperature (HDT) of at least 150° C., preferably of at least 180° C.

Advantageously, said three-dimensional object is a component of sports equipment, of a shoe, of a sports shoe, of a shoe sole, of a decoration, of luggage, of glasses, of furniture, of audio-visual equipment, of a computer or of automobile or aeronautical equipment and/or a component of medical equipment.

EXAMPLES

The examples below illustrate the present invention without limiting the scope thereof. In the examples, unless otherwise indicated, all the percentages and parts are expressed by weight.

Products used in the compositions of the following tests (examples and comparatives):

PA11-Based Powder:

PA 11 powder synthesized by grinding a prepolymer obtained by polycondensation of 11-aminoundecanoic acid, followed by treatment with water and rise in viscosity. The PA 11 powder has a relative viscosity equal to 1.20 (20° C., in 0.5% by weight solution in meta-cresol).

Although the tests refer to a composition based on Rilsan® PA11, it is understood that the compositions according to the present invention are not limited to this embodiment but can comprise any type of polyamide, alone or as a mixture.

The Flow Agent:

The flow agent used in all the following tests is fumed silica, it represents less than 0.5% by weight and its content is the same in each composition. Its d50 is less than 20 μm.

Glass Fibers:

The glass fibers are of E type (DIN 1259).

The compositions of tests 1) to 3) use 25% of glass fibers, the size and shape characteristics of which are shown in table 3 below:
1) Example 1 (Ex1)
2) Comparative example 2 (Cp2)
3) Comparative example 3 (Cp3)

The compositions of tests 4) and 5) use 30% of glass fibers:
4) Comparative example 4 (Cp4)
5) Example 5 (Ex5)

TABLE 3

|  |  | 1) Ex1 | 2) Cp2 | 3) Cp3 | 4) Cp4 | 5) Ex5 |
|---|---|---|---|---|---|---|
| mean fiber diameter | d50 | 14 μm | 14 μm | 14 μm | 16 μm | 14 μm |
| mean fiber length | 150 | 150 μm | 210 μm | 50 μm | Presence of long fibers >500 μm | 150 μm |
| fiber treatment | sizing | silane | silane | silane | silane | silane |
| form factor | F = 150/d50 | 10.7 | 15 | 3.6 | 10 | 10.7 |
| addition of the fibers | by: | dry blend mixing 25% GF in the PA11-based powder | | | dry blend mixing 30% GF in the PA11-based powder | |
| flowability | Ø 25 mm | 4 s | 40 s | 4.8 s | 12 s | 5.7 s |
|  | Ø 15 mm | 16 s | difficult (>50 s – 1 min) | impossible | impossible | 23.3 s |
|  | Ø 10 mm | difficult (>1 min 20) | impossible | impossible | impossible | impossible |
| 3D printing passage through the machine |  | X/Y construction OK | difficult | impossible | X/Y construction difficult | OK |

TABLE 3-continued

|  |  | 1) Ex1 | 2) Cp2 | 3) Cp3 | 4) Cp4 | 5) Ex5 |
|---|---|---|---|---|---|---|
| elastic modulus | (Objective > 3000 MPa) | 3800 MPa | 4200 MPa | — | 2930 MPa | 3880 MPa |
| elongation at break | (objective > 6%) | 9-10% | 6% | — | 15% | 7.30% |
| HDT | (objective > 150° C.) | 185-187° C. | <150° C. | — | <150° C. | >150° C. |
| breaking stress | (objective > 60 MPa) | 61-62 MPa | 70 MPa | — | 48.4 MPa | 65.8 MPa |

Passage of the Compositions Obtained Through the Machine for Sintering:

A Laser Sintering Formiga P100 (EOS) machine is used.

The conditions for passage through the laser machine which are fixed and common to all the compositions are: outline speed=1500 mm/s, hatch speed=2500 mm/s, "beam offset" hatching=0.15 mm The conditions of the tests of table 3 shown in the following table 4:

TABLE 4

|  | Exposure chamber temperature (° C.) | Shrinkage chamber temperature (° C.) | Laser power for the outline (watts) | Laser power for the hatching (watts) |
|---|---|---|---|---|
| Example 1 | 180 | 158 | 16 | 24 |
| Comparative example 2 | 180 | 158 | 16 | 24 |
| Comparative example 3 | 180 | 158 | 16 | 24 |
| Comparative example 4 | 180 | 158 | 16 | 24 |
| Example 5 | 180 | 158 | 16 | 24 |

The parts manufactured by laser sintering of the various compositions are, in all the tests, tensile test specimens which are dumbbells with dimensions of 150*20*3 mm of type 1B.

In comparative tests 2 and 3, the passage through a 3D printing machine or device is difficult (Cp2) or even impossible (Cp3) due to a nonconforming form factor of the fibers, respectively 15 (too large) and 3.6 (too small). In addition, the mechanical properties of the 3D parts obtained are inadequate, the elongation at break being too low in the case of Cp2.

In comparative test 4 (Cp4), the presence of long fibers (fiber length of greater than 500 μm) is incompatible with the 3D printing process. In addition, the breaking stress of the 3D parts is inadequate.

In contrast, the passage through a 3D machine takes place very simply for the compositions of examples 1 and 5 (Ex1 and Ex5) according to the invention.

Surface Appearance of the 3D Objects Obtained:

Examples 1 and 5 according to the invention exhibit a regular, smooth and homogeneous surface appearance with precise edges.

Comparative examples 2 and 4 exhibit an opposite appearance: in particular a degraded surface appearance with the presence of cracks.

Measurement of the Mechanical Properties of the Dumbbells Obtained by Sintering:

The following are obtained for examples 1 and 5 according to the invention, simultaneously:

an elastic modulus of at least 3500 MPa,
an elongation at break of greater than 6%,
a breaking stress of greater than 60 MPa,
the tensile modulus, the elongation and the stress being measured according to the standard ISO 527-2:93-1B; and
a heat deflection temperature (HDT) of at least 150° C., determined according to the standard ISO 75-2:2013 (fr) method A.

The use of a powder composition according to the invention in examples 1 and 5, by a 3D printing process, makes it possible to directly obtain reinforced parts, of good definition and with mechanical properties compatible with use in the automobile industry or the aeronautical industry.

Measurement of the Modulus of a "Cp6" Dumbbell Obtained by Injection Molding of the Same Composition as in Example 1:

=>Modulus of the Ex1 parts obtained by laser sintering=3800 MPa
=>Modulus of the Cp6 parts obtained by injection molding in a microextruder=2500 MPa These results correspond to a PA11 powder additivated by dry blending with 25% of glass fibers.

The coupling [polyamide 11 powder+glass fibers with a dimension according to the invention] works much better in 3D printing (additive manufacturing) than in injection molding: for one and the same fiber and one and the same composition according to the invention, the modulus of the manufactured object is much greater in laser sintering than in injection molding.

For one and the same PA powder containing glass fibers in accordance with the invention, the mechanical properties obtained in laser sintering are superior to those obtained in injection molding.

An example 6 (Ex6) according to the invention was carried out by mixing the PA11 powder with 40% by weight of fibers as used in examples 1 and 5 with regard to the total weight of the composition.

The composition obtained was passed through the Laser Sintering Formiga P100 (EOS) machine under conditions similar to those described above in order to manufacture tensile test specimens which are dumbbells with dimensions of 150*20*3 mm³ of type 1B (standard ISO 527-2 1B) in the XY position.

The mechanical properties of the test specimens obtained, measured as indicated above, are summarized in the following table 5:

TABLE 5

|  | Ex6 |
|---|---|
| Elastic modulus | 5260 MPa |
| HDT | 180-182.5° C. |
| Breaking stress | 62 MPa |

Two examples 7 and 8 (Ex7, Ex8) according to the invention based on PA12 were carried out and compared with comparative examples 9 and 10 (Cp9, Cp10).

Example 7 and comparative example 9 comprise Orgasol PA12 (Arkema). Example 8 and comparative example 10 comprise PA12 obtained differently by dissolution/precipitation.

A mixture is produced from the PA12 powder in a similar manner to that which was described above with 30% by weight, with respect to the total weight of the mixture, of glass fibers identical to those of examples 1 and 5 for examples 7 and 8 and with 30% by weight, with respect to the total weight of the mixture, of glass fibers with a length greater than 1 mm for comparative examples 9 and 10.

The compositions obtained were passed through the Laser Sintering Formiga P100 (EOS) machine under conditions similar to those described above in order to manufacture tensile test specimens which are dumbbells with dimensions of 150*20*3 mm³ of type 1B (standard ISO 527-2 1B) in the XY position.

Construction is impossible with the compositions of comparative examples 9 and 10, which do not pass through the machine.

The results for examples 7 and 8 are presented in table 6 below:

TABLE 6

|  | Ex7 | | Ex8 | |
| --- | --- | --- | --- | --- |
|  | Along the X axis Parallel stress | Along the Y axis Perpendicular stress | Along the X axis Parallel stress | Along the Y axis Perpendicular stress |
| Elastic modulus | 4500 MPa | 3000 MPa | 4500 MPa | 3048 MPa |
| Breaking stress | 60 MPa | / | 54 MPa | 40 MPa |
| Elongation at break | 4.4% | 5.7% | 3.3% | 3.4% |

The invention claimed is:

1. A reinforced thermoplastic powder composition, comprising:
   at least one polyamide powder with a d50 of less than 100 µm,
   from 5% to 70% by weight of glass fibers:
      with an l50 within the range from 50 to 200 µm,
      with an lmax of less than 450 µm,
      with a d50 within the range from 4 to 40 µm,
      with a form factor F: l50/d50 of between 5 and 15, and
   from 0.05% to 5% of a pulverulent flow agent with a d50 of less than 20 µm;
   with regard to the total weight of the composition,
   wherein the pulverulent flow agent is chosen from: silicas, hydrated silicas, amorphous alumina, vitreous silicas, vitreous phosphates, vitreous borates, vitreous oxides, titanium dioxide, talc, mica, fumed silicas, pyrogenic silicas, kaolin, attapulgite, calcium silicates, alumina and magnesium silicates.

2. The composition as claimed in claim 1, in which said polyamide is chosen from: polyamides and copolyamides comprising at least one of the following monomers: 46, 4T, 54, 59, 510, 512, 513, 514, 516, 518, 536, 6, 64, 69, 610, 612, 613, 614, 616, 618, 636, 6T, 9, 104, 109, 1010, 1012, 1013, 1014, 1016, 1018, 1036, 10T, 11, 12, 124, 129, 1210, 1212, 1213, 1214, 1216, 1218, 1236, 12T, MXD6, MXD10, MXD12, and MXD14.

3. The composition as claimed in claim 1, in which said polyamide is chosen from: PA 11, PA 12, PA 1010, PA 6, PA 6/12, PA 11/1010, and their mixtures.

4. The composition as claimed in claim 1, in which the glass fibers comprise, expressed in terms of oxides as % by weight with regard to the weight of glass fiber: from 52% to 74% of silicon dioxide ($SiO_2$), from 2% to 26% of aluminum oxide ($Al_2O_3$), from 0% to 23% of boron oxide ($B_2O_3$), from 0% to 25% of calcium oxide (CaO), from 0% to 25% of magnesium oxide (MgO), from 0% to 5% of zinc oxide (ZnO), from 0% to 5% of strontium oxide (SrO), from 0% to 1% of barium oxide (BaO), from 0% to 5% of lithium oxide ($Li_2O$), from 0% to 16% of sodium oxide ($Na_2O$), from 0% to 20% of zirconium oxide ($ZrO_2$), from 0% to 3% of potassium oxide ($K_2O$), from 0% to 3% of titanium oxide ($TiO_2$), from 0% to 3% of iron oxide ($Fe_2O_3$).

5. The composition as claimed in claim 1, in which the glass fibers represent from 5% to 60% by weight, with regard to the total weight of the composition.

6. The composition as claimed in claim 1, in which the glass fibers exhibit:
   an l50 within the range from 100 to 200 µm,
   a d50 within the range from 6 to 30 µm,
   a form factor F: l50/d50 of between 8 and 12.

7. The composition as claimed in claim 1, in which the d50 of the glass fibers is within the range from 10 to 25 µm.

8. The composition as claimed in claim 1, in which the form factor F: l50/d50 of the fibers is within the range from 9 to 11.

9. A process for the manufacture of a powder composition as claimed in claim 1, comprising the following stages:
   a) mixing by dry blending of the polyamide powder with the glass fibers;
   b) adding the flow agent to the powder obtained in a).

10. A process for the manufacture of a reinforced three-dimensional object, comprising layer-by-layer sintering of a powder having a composition in accordance with claim 1, said process producing an X/Y construction.

11. A reinforced three-dimensional object manufactured according to the process of claim 10, said object having mechanical properties which are superior to those of an object of the same shape manufactured by an injection molding process of said composition.

12. The object as claimed in claim 11, wherein the object exhibits:
   an elastic modulus of at least 3000 MPa,
   an elongation at break of greater than 6%,
   a breaking stress of greater than 60 MPa, and
   a heat deflection temperature (HDT) of at least 150° C.

13. The object as claimed in claim 11, said object being a component of sports equipment, of a shoe, of a sports shoe, of a shoe sole, of a decoration, of luggage, of glasses, of furniture, of audio-visual equipment, of a computer or of automobile or aeronautical equipment and/or a component of medical equipment.

14. A process for manufacturing an object, comprising 3D-printing the object using 25% to 40% by weight of glass fibers:
   with a l50 within the range from 50 to 200 µm,
   with an lmax of less than 450 µm,
   with a d50 within the range from 4 to 40 µm,
   with a form factor F: l50/d50 of between 5 and 15,
      in a polyamide-based powder with a d50 of less than 100 µm, wherein the object has a modulus greater than the modulus of an object of the same shape manufactured by injection molding of the same composition.

15. The process as claimed in claim 14, in which the glass fibers exhibit:
   an l50 within the range from 100 to 200 μm,
   a d50 within the range from 10 to 25 μm,
   a form factor F: l50/d50 of between 8 and 12.

* * * * *